Patented Mar. 16, 1937

2,073,728

UNITED STATES PATENT OFFICE 2,073,728

PROCESS FOR THE MANUFACTURE OF CHROMATABLE AZO DYESTUFFS OF THE PYRAZOLONE SERIES

Jakob Böhi, Basel, Switzerland, assignor to the firm Chemical Works formerly Sandoz, Basel, Switzerland No Drawing. Application July 8, 1935, Serial No. 30,409. In Switzerland July 17, 1934

10 Claims. (Cl. 260—44.6)

The present invention relates to new chromatable yellow azo dyestuffs of the pyrazolone series and to a process for their manufacture.

It has been found that new very valuable chromatable yellow azo dyestuffs of the pyrazolone series can be produced by coupling diazotized 2-aminobenzene-1-carboxylic acid-sulpharylides containing in the aryl-nucleus a carboxylic acid group and possessing the general formula:

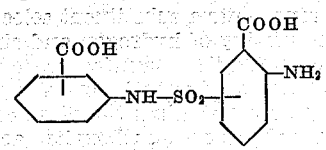

wherein the aromatic nuclei may be further substituted by other substituents than the carboxylic and sulphonic acid groups, with pyrazolones free from water solubilizing groups and possessing the general formula:

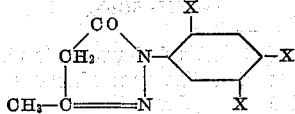

wherein X represents hydrogen or chlorine.

The dyestuffs thereby obtained dye animal fibres generally yellow shades, which when aftertreated with compounds yielding chromium, possess very good fastness properties. The special value of the dyestuffs prepared by the present process further resides in that they can be dyed by the so-called metachrome-process yielding without addition of any acid full shades of excellent fastness properties.

One object of the present invention is, therefore, a process for the manufacture of new chromatable yellow azo dyestuffs of the pyrazolone series, consisting in coupling sulpharylides of the general formula:

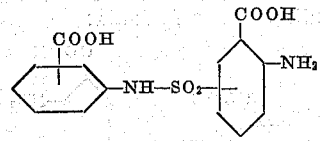

wherein the aromatic nuclei may be further substituted by substituents other than the carboxylic and sulphonic acid groups, with pyrazolones free from water solubilizing groups and possessing the general formula:

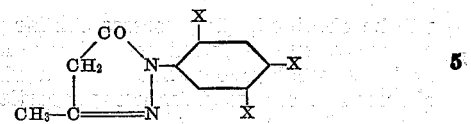

wherein X represents hydrogen or chlorine.

Another object of the present invention is the chromatable yellow azo dyestuffs of the pyrazolone series of the general formula:

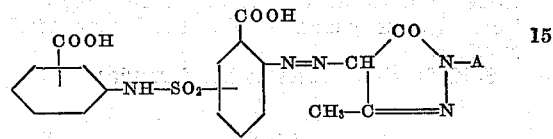

wherein the aromatic nuclei may be further substituted by substituents other than carboxylic and sulphonic acid groups and wherein A represents hydrogen, a phenyl nucleus or a halogenated phenyl nucleus, which are in the dry state yellow powders dyeing animal fibres yellow shades, which can be afterchromed and which yield dyeings of excellent fastnesses by the metachrome process.

The following examples, without being limitative, illustrate the present invention, the parts being by weight.

Example 1

336 parts of 2-aminobenzene-1-carboxylic acid-5-sulphanthranilide are diazotized in the usual manner and copulated in an alkaline medium with 174.1 parts of 1-phenyl-3-methyl-5-pyrazolone. After the copulation has completely occurred, the dyestuff is isolated from its solution in a known manner, for example by salting it out, and thereupon dried.

The dyestuff thus obtained possesses as free acid the formula:

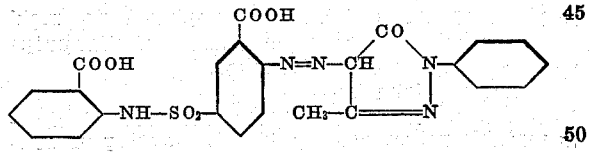

and is in the dry state a yellow powder easily soluble in water in form of its alkali metal salts. It dyes wool yellow shades, which when afterchromed, possess an excellent fastness to light, milling and fulling.

By dyeing wool with this dyestuff in presence of metachrome mordant and in neutral bath, dyeings are obtained that are even faster to milling and fulling than those obtained by the afterchroming method.

*Example 2*

336 parts of 2-aminobenzene-1-carboxylic-acid-5-sulpho-(3'-carboxy)anilide are diazotized in the usual manner and copulated with 174.1 parts of 1-phenyl-3-methyl-5-pyrazolone. In this manner, a dyestuff of the formula:

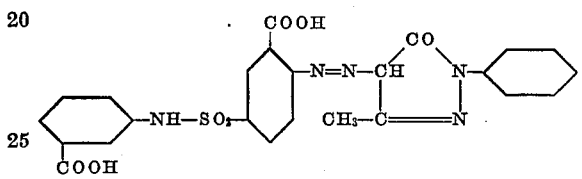

will be obtained. It possesses similar properties as the dyestuff prepared according to Example 1 and dyes wool yellow shades which when afterchromed possess good fastness properties.

*Example 3*

By replacing in Example 1 the 1-phenyl-3-methyl-5-pyrazolone by an equivalent quantity of 1,(2':5'-dichloro)-phenyl-3-methyl-5-pyrazolone, a dyestuff will be obtained which dyes wool greener yellow shades than that of Example 1.

Said dyestuff possesses the formula:

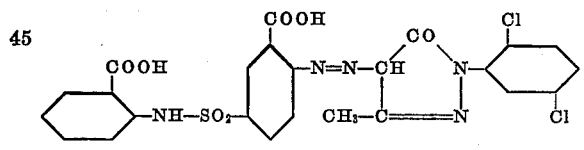

Similar dyestuffs will be obtained if instead of the amines used in Examples 1 and 2, other similar amines are employed. Such amines can be prepared by condensing p-aminobenzoic acid or halogen- or nitroamino-benzoic acids with o-chlorobenzoic acid sulphochloride and subsequent amidation of the condensation products. Instead of an o-chlorobenzoic acid sulphochloride also compounds such as 2-nitrotoluene-4-sulpochloride or 1-acetylamino-2-methylbenzene-5-sulphochloride can be used and the methyl group contained in the condensation products can be oxidized to the carboxyl group and the nitro group reduced to amino-group, or the acetylamino group saponified in any usual manner.

Instead of the pyrazolones used in the examples other pyrazolone compounds such as monochlorophenyl-methylpyrazolone or nitrophenylpyrazolone can be employed to yield chromatable yellow azo dyestuffs of similar properties to those above described.

What I claim is:—

1. A process for the manufacture of chromatable yellow azo dyestuffs, consisting in coupling diazo compounds obtainable from sulpharylides of the general formula

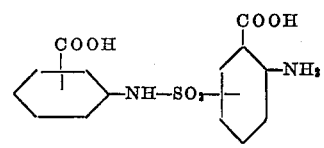

with pyrazolones of the general formula

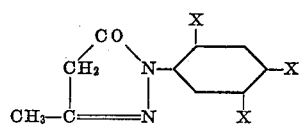

wherein X represents a substituent selected from the group consisting of hydrogen and chlorine.

2. A process for the manufacture of chromatable yellow azo dyestuffs, consisting in coupling in an alkaline medium diazo compounds obtainable from sulpharylides of the general formula:

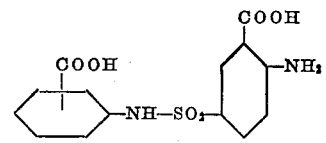

with pyrazolones of the general formula:

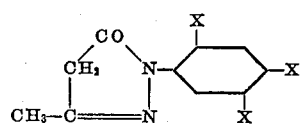

wherein X represents a substituent selected from the group consisting of hydrogen and chlorine.

3. A process for the manufacture of a chromatable yellow azo dyestuff, consisting in coupling in an alkaline medium the diazo compound from 2-aminobenzene-1-carboxylic acid-5-sulphanthranilide of the formula:

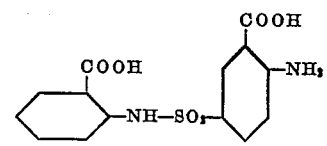

with 1-phenyl-3-methyl-5-pyrazolone.

4. A process for the manufacture of a chromatable yellow azo dyestuff, consisting in coupling in an alkaline medium the diazo compound from 2-aminobenzene-1-carboxylic acid-5-sulpho-(3'-carboxy)anilide of the formula:

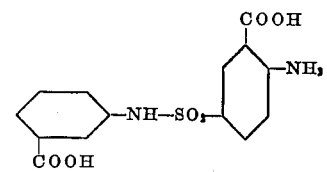

with 1-phenyl-3-methyl-5-pyrazolone.

5. A process for the manufacture of a chromatable yellow azo dyestuff, consisting in coupling in an alkaline medium the diazo compound from 2-aminobenzene-1-carboxylic acid-5-sulphanthranilide of the formula:

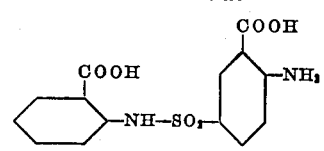

with 1-2':5'-dichloro)phenyl-3-methyl-5-pyrazolone.

6. The chromatable yellow azo dyestuffs of the general formula:

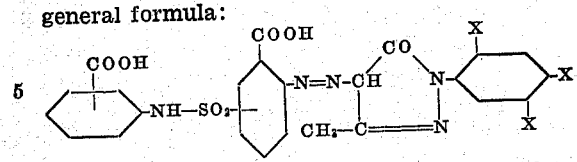

wherein X represents a substituent selected from the group consisting of hydrogen and chlorine, which are in the dry state yellow powders dyeing animal fibres yellow shades, which can be after-chromed and which by the metachrome process yield dyeings of excellent fastness.

7. The chromatable yellow azo dyestuffs of the formula:

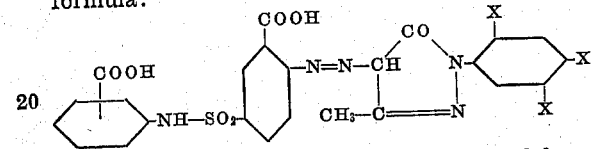

wherein X represents a substituent selected from the group consisting of hydrogen and chlorine, which are in the dry state yellow powders dyeing animal fibres yellow shades, which can be after-chromed and which by the metachrome process yield dyeings of excellent fastness.

8. The chromatable yellow azo dyestuff of the formula:

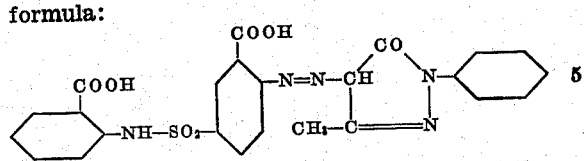

9. The chromatable yellow azo dyestuff of the formula:

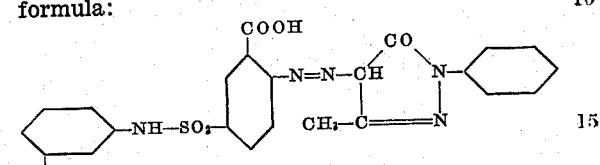

10. The chromatable yellow azo dyestuff of the formula:

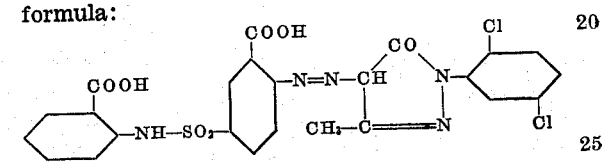

JAKOB BÖHI.